(12) United States Patent
Dumais et al.

(10) Patent No.: US 8,954,954 B2
(45) Date of Patent: Feb. 10, 2015

(54) METHOD AND DEVICE FOR APPLICATION INSTALLATION TO MULTIPLE MEMORY COMPONENTS

(75) Inventors: Paul Mark Joseph Dumais, Nepean (CA); Brian Alexander Zubert, Waterloo (CA); Michael Grant Kirkup, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 603 days.

(21) Appl. No.: 12/796,703

(22) Filed: Jun. 9, 2010

(65) Prior Publication Data

US 2011/0271273 A1   Nov. 3, 2011

Related U.S. Application Data

(60) Provisional application No. 61/329,849, filed on Apr. 30, 2010.

(51) Int. Cl.
  *G06F 9/445* (2006.01)

(52) U.S. Cl.
  CPC .......................................... *G06F 8/61* (2013.01)
  USPC ........................................... 717/175; 717/174

(58) Field of Classification Search
  CPC ..................................... G06F 8/60; G06F 8/61
  USPC ................................................. 717/168–178
  See application file for complete search history.

(56) References Cited

U.S. PATENT DOCUMENTS

| | | | |
|---|---|---|---|
| 5,721,824 A * | 2/1998 | Taylor ............................ | 709/203 |
| 5,768,597 A * | 6/1998 | Simm ............................. | 717/174 |
| 6,006,035 A * | 12/1999 | Nabahi ........................... | 717/175 |
| 6,496,979 B1 * | 12/2002 | Chen et al. ..................... | 717/178 |
| 6,892,255 B2 * | 5/2005 | Teshima .......................... | 710/74 |
| 7,512,635 B1 * | 3/2009 | Solin ...................................... | 1/1 |
| 2002/0083422 A1 * | 6/2002 | Scouten ......................... | 717/140 |
| 2003/0135851 A1 * | 7/2003 | Dickey et al. ................. | 717/168 |
| 2003/0225986 A1 * | 12/2003 | Teshima ......................... | 711/165 |
| 2005/0091111 A1 * | 4/2005 | Green et al. ..................... | 705/14 |
| 2005/0105374 A1 * | 5/2005 | Finke-Anlauff et al. ..... | 365/232 |
| 2005/0193389 A1 | 9/2005 | Murphy et al. | |
| 2007/0100963 A1 | 5/2007 | Ban et al. | |
| 2007/0214453 A1 | 9/2007 | Dive-Reclus | |
| 2007/0234345 A1 * | 10/2007 | Kramer et al. ................. | 717/174 |
| 2007/0245344 A1 | 10/2007 | Kumagai et al. | |
| 2008/0127179 A1 | 5/2008 | Moss et al. | |

(Continued)

FOREIGN PATENT DOCUMENTS

| | | |
|---|---|---|
| EP | 1 534 029 | 5/2005 |
| GB | 2 418 042 | 3/2006 |

(Continued)

OTHER PUBLICATIONS

U.S. Appl. No. 12/703,272, filed Feb. 10, 2010.

(Continued)

*Primary Examiner* — Qing Chen
(74) *Attorney, Agent, or Firm* — Rowand LLP

(57) ABSTRACT

A method and device for installing an application to a device are provided. The method includes: receiving, at the device, application files associated with the application, the application files including computer readable instruction files and resource files; installing, by an installation manager, the computer readable instruction files to a first memory component associated with the device; and storing the resource files on a second memory component associated with the device.

24 Claims, 6 Drawing Sheets

(56) References Cited

U.S. PATENT DOCUMENTS

2009/0037287 A1    2/2009  Baitalmal et al.
2009/0133014 A1    5/2009  Laurila et al.
2009/0172658 A1*   7/2009  Wood et al. ................... 717/174
2010/0049895 A1*   2/2010  Liang ............................ 710/308

FOREIGN PATENT DOCUMENTS

WO      WO02/41139       5/2002
WO      WO2006/035368    4/2006

OTHER PUBLICATIONS

European Search Report dated Aug. 12, 2010.
Androlib.com, Pack for Space Physics Full v1.5.3 Game for Android 1 Brain & Puzzle, http://www.androlib.com/android.application.com-camelgames-spacephysicslevels.zqxC.aspx, pp. 1-2, Nov. 20, 2009.
Digitalmars.Com, Compiling Resources with RC, http://www.digitalmars.com/ctg/ctgRC.html, pp. 1-7, Jan. 17, 2010.
Wikipedia, The Free Encyclopedia, U3, http://en.wikipedia.org/wiki/U3, pp. 1-5, Jan. 2, 2010.
Ehow.com, How to Use a Memory Card in the Garmin C330 GPS, http://www.ehow.com/how6109092use-card-garmin-c330-gps.html, p. 1, Jul. 8, 2010.
Dumais, Paul Mark Joseph, title: Remote Application Storage, U.S. Appl. No. 12/703,272, pp. 1-56, filed Feb. 10, 2010.
EPO Office Action dated Sep. 5, 2012.
Doom WAD, from Wikipedia, the free encyclopedia, Feb. 18, 2008.

* cited by examiner

METHOD AND DEVICE FOR APPLICATION INSTALLATION TO MULTIPLE MEMORY COMPONENTS

CROSS-REFERENCE TO RELATED APPLICATIONS

This application claims the benefit of and priority to U.S. provisional patent application Ser. No. 61/329,849 filed Apr. 30, 2010, the contents of which are incorporated herein by reference.

TECHNICAL FIELD

The present disclosure relates generally to installation managers and, more particularly to methods and systems for installing applications for use on an electronic device.

BACKGROUND

Mobile electronic devices typically have limited application memory available for storage. This application memory may be occupied, for example, by data such as service data including information required by the mobile electronic device to establish and maintain communication with a wireless network, user application data such as email messages, address book and contact information, calendar and schedule information, notepad documents, image files, and other commonly stored user information.

The application memory may also have applications stored thereon such as, for example, instant messaging applications, email applications, word processing applications, media player applications, games, etc. Some of these applications may be loaded by the manufacturer of the device or a service provider associated with the device. In other cases, the applications may be loaded onto the device by the user.

Due to the limited amount of memory available, the mobile electronic device may run out of application memory. A user may wish to install an application to a device which does not have sufficient application memory to support such an application.

BRIEF DESCRIPTION OF THE DRAWINGS

Like reference numerals are used in the drawings to denote like elements and features.

DETAILED DESCRIPTION OF EXAMPLE EMBODIMENTS

In one aspect, the present application provides a method of installing an application to a device. The method includes: receiving, at the device, application files associated with the application, the application files including computer readable instruction files and resource files; installing, by an installation manager, the computer readable instruction files to a first memory component associated with the device; and storing the resource files on a second memory component associated with the device.

In another aspect, the present application provides an electronic device. The electronic device includes a first memory component and at least one second memory component. The electronic device includes at least one processor configured to: receive application files associated with an application, the application files including computer readable instruction files and resource files; install the computer readable instruction files to the first memory component; and store the resource files on the second memory component.

In another aspect, the present application provides a computer program product comprising a computer readable storage medium having encoded thereon computer executable instructions, the computer executable instructions comprising: computer executable instructions for receiving, at the device, application files associated with the application, the application files including computer readable instruction files and resource files; computer executable instructions for installing, by an installation manager, the computer readable instruction files to a first memory component associated with the device; and computer executable instructions for storing the resource files on a second memory component associated with the device.

Other aspects of the present application will be apparent to those of ordinary skill in the art from a review of the following detailed description in conjunction with the drawings.

Example embodiments of the present application are not limited to any particular operating system, mobile device architecture, server architecture, or computer programming language.

Figure 1:
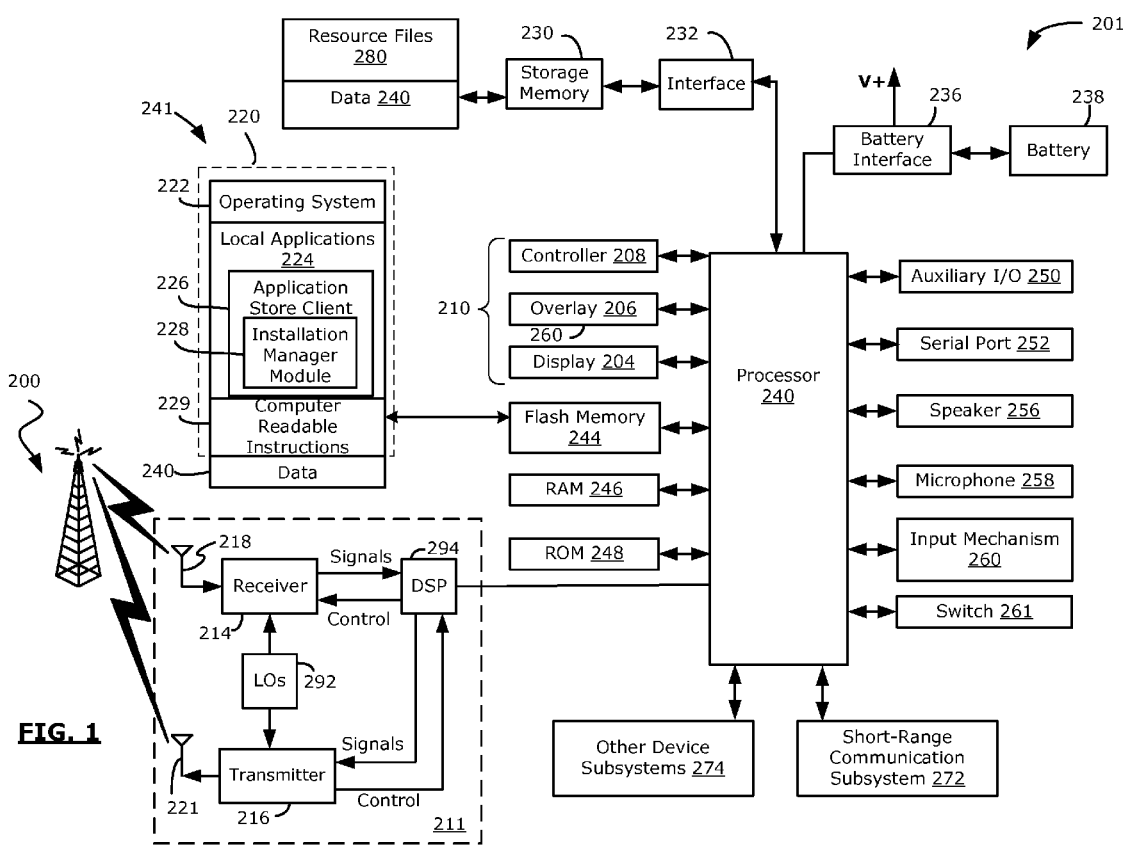
FIG. 1 is a block diagram illustrating a mobile electronic device in accordance with one example embodiment of the present disclosure.

Reference is now made to FIG. 1 which illustrates a mobile electronic device 201 in which example embodiments described in the present disclosure can be applied. The mobile electronic device 201 may, in various example embodiments, also be referred to as a wireless device 201, a mobile communication device 201, an electronic device 201 and/or a device 201. In the example embodiment shown, the mobile electronic device 201 is a two-way mobile communication device having data and possibly also voice communication capabilities, and the capability to communicate with other computer systems, for example, via the Internet. Depending on the functionality provided by the mobile electronic device 201, in various example embodiments the device may be a data communication device, a multiple-mode communication device configured for both data and voice communication, a smartphone, a mobile telephone or a PDA (personal digital assistant) enabled for wireless communication, or a computer system with a wireless modem. It will be appreciated that, in some example embodiments, the systems and methods presented herein may be applied to an electronic device that does not, necessarily, have communication capabilities; such as, for example a PDA which is not enabled for communication.

The mobile electronic device 201 includes at least one controller comprising at least one processor 240 such as a microprocessor which controls the overall operation of the mobile electronic device 201, and a wireless communication subsystem 211 for exchanging radio frequency signals with a wireless network 200. The processor 240 interacts with the communication subsystem 211 which performs communication functions. The processor 240 interacts with additional device subsystems. In some example embodiments, the device 201 may include a touchscreen display 210 which includes a display (screen) 204, such as a liquid crystal display (LCD) screen, with a touch-sensitive input surface or overlay 206 connected to an electronic controller 208. The touch-sensitive overlay 206 and the electronic controller 208 provide a touch-sensitive input device and the processor 240 interacts with the touch-sensitive overlay 206 via the electronic controller 208. The touch-sensitive overlay 206 acts as an input mechanism 260, allowing the user of the device 201 to input commands to the processor 240. In other example embodiments, the display 204 may not be a touchscreen display. Instead, the device 201 may simply include a non-touch display and one or more other input mechanisms 260, such as, for example, a depressible scroll wheel, track pad, joy stick, or track ball. In some example embodiments, the device 201 may have a touchscreen display 210 and also other input mechanisms 260.

The processor 240 interacts with additional device subsystems including flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, input mechanisms 260, switch 261, short-range communication subsystem 272, and other device subsystems generally designated as 274. Some of the subsystems shown in FIG. 1 perform communication-related functions, whereas other subsystems may provide "resident" or on-device functions.

The communication subsystem 211 includes a receiver 214, a transmitter 216, and associated components, such as one or more antenna elements 218 and 221, local oscillators (LOs) 292, and a processing module such as a digital signal processor (DSP) 294. The antenna elements 218 and 221 may be embedded or internal to the mobile electronic device 201 and a single antenna may be shared by both receiver and transmitter, as is known in the art. As will be apparent to those skilled in the field of communication, the particular design of the communication subsystem 211 depends on the wireless network 200 in which the mobile electronic device 201 is intended to operate.

The mobile electronic device 201 may communicate with any one of a plurality of fixed transceiver base stations of the wireless network 200 within its geographic coverage area. The mobile electronic device 201 may send and receive communication signals over the wireless network 200 after a network registration or activation procedures have been completed. Signals received by the antenna 218 through the wireless network 200 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 294. In a similar manner, signals to be transmitted are processed, including modulation and encoding, for example, by the DSP 294. These DSP-processed signals are input to the transmitter 216 for digital-to-analog (D/A) conversion, frequency up conversion, filtering, amplification, and transmission to the wireless network 200 via the antenna 221. The DSP 294 not only processes communication signals, but may also provide for receiver and transmitter control. For example, the gains applied to communication signals in the receiver 214 and the transmitter 216 may be adaptively controlled through automatic gain control algorithms implemented in the DSP 294.

The processor 240 operates under stored program control and executes software modules 220 stored in a first memory component, which in some example embodiments, is an application memory 241 such as persistent memory; for example, in the flash memory 244. As illustrated in FIG. 1, the software modules 220 comprise operating system software 222, local applications 224 which, in some example embodiments, may include an application store client 226 for requesting and receiving software applications from an application delivery server (not shown). The application delivery server is a remote server (which may be accessible through the network 200) from which the device 201 may purchase and receive applications. In some example embodiments, the application store client 226 may be configured to wirelessly download applications 224 from the application delivery server for installation onto the device 201. The application store client 226 may interface with the application delivery server to provide the function of an application delivery store which allows a device 201 (or a user of the device 201) to purchase and download applications 224 for use on the device 201.

In some example embodiments, the application store client 226 may also interface with the application delivery server to provide remote storage capabilities to the device 201. The application delivery server may track application purchases and/or downloads and may allow the device 201 to download applications 224 which were previously purchased and/or downloaded. That is, the application delivery server may function as a rights management server to maintain a database which tracks applications which a device 201 and/or user have rights to. Rights to an application may be obtained, in some example embodiments, as a result of a previous purchase of that application. In some example embodiments, rights may be obtained as a result of a previous download of that application. The application delivery server may interact with the application store client 226 to permit a device 201 to download an application 224 to that that device 201 if the device 201 and/or the user of the device 201 have rights to that application 224.

The application store client 226 permits users of the mobile electronic device 201 to connect to the application delivery server through the communication subsystem 211 and to browse or search for applications available for download to the mobile electronic device 201. A user of the mobile electronic device 201 may request the download of an application from the application delivery server by interacting with the application store client 226 on the mobile device 201; for example, by engaging the touchscreen display 210, or other input mechanism 260.

The software modules 220 also include an installation manager module 228 for installing applications 224 on the device 201. As will be explained in greater detail below, in some example embodiments, the installation manager module 228 (which may also be referred to as an installer, installer module, or installation manager) is configured to install an application 224 to the device 201. That is, the installation manager module 228 is configured to receive application files associated with an application 224 and to install those application files to the device 201. The application files may include computer readable instructions 229, such as executable files or code. The computer readable instructions 229 may be contained in computer readable instruction files. The application files may also include resource files 280, such as image files, video files, and/or audio files.

Resource files 280 are non-executable files which may be referenced by the computer readable instructions 229, such as the executable code, to provide additional features or functionality to applications 224. Resource files 280 are used by an application at run-time of the computer readable instructions. Resource files 280 are, in at least some example embodiments, called by the computer readable instructions 229 to provide graphical user interface features for the application. By way of example, in some embodiments, the application may be a game. In such embodiments, the resource files 280 may include graphic files which are rendered on the device 221 at run time of the application.

In some example embodiments, an application 224 (including the application files) may be received from an application delivery server (not shown) though the application store client 226. After receipt of the application 224, the installation manager module 228 may install the application 224 to the device 201. The installation of the application 224 to the device 201 may, in some example embodiments, occur automatically. That is, when an application 224 is received at the device 201, the device 201 may be configured to automatically install the application 224 to the device.

In some example embodiments, the installation manager module 228 may install complete applications 224 to the first memory component, which, in the embodiment illustrated, is the application memory 241. For example, in FIG. 1, the application store client 226 is installed completely to the first memory component. An application 224 which is installed completely to the first memory component is an application 224 having application files which are all installed to the first memory component. For example, an application having computer readable instructions and resource files is installed completely to the first memory component if the computer readable instructions (such as for example executable files or code) and resource files (such as for example image files, video files and/or audio files) are both installed to the first memory component.

As will be explained in greater detail below, the installation manager module 228 is configured to split the installation of at least some applications 224. The installation manager module 228 may split the installation by storing application files associated with the application in two or more different physical memory components associated with the device 201. For example, in some example embodiments, applications 224 may be comprised of computer readable instructions 229 (such as for example executable files or code) and resource files 280 (such as for example image files, video files, and/or audio files). The installation manager module 228 may be configured to install the computer readable instructions 229 to a first memory component, such as the application memory 241. The installation manager module 228 may be configured to install the resource files 280 to a second memory component, such as storage memory 230. In at least some example embodiments, the operating system 222 associated with the device 201 is configured to allow for the execution of computer readable instructions 229 stored on the first memory component. However, in at least some example embodiments, the operating system 222 associated with the device 201 is configured to not allow the execution of computer readable instructions stored on the second memory component.

In the example embodiment shown, the installation manager module 228 is illustrated as being provided by the application store client 226. It will be appreciated that the installation manager module 228 may, in other example embodiments, be a stand-alone component that is operationally separate from the application store client 226. In further example embodiments, the installation manager module 228 may be provided, in whole or in part, by the operating system software 222 itself. Accordingly, the application store client 226 and the installation manager module 228 may, among other things, be implemented through stand-alone software applications, or combined together in one or more of the operating system 222 and other local applications 224. Those skilled in the art will appreciate that the software modules 220 in the application memory 241 (or other first memory component) or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The local software applications 224 may also include a range of other applications, including, for example, an address book application, a messaging application, a calendar application, and/or a notepad application. In some example embodiments, the local software applications 224 include an email message application, a push content viewing application, a voice communication (i.e. telephony) application, a map application, and a media player application. Each of the local software applications 224 may include layout information defining the placement of particular fields and graphic elements (e.g. text fields, input fields, icons, etc.) in the user interface (i.e. the display device 204) according to the application.

In some example embodiments, the auxiliary input/output (I/O) subsystems 250 may comprise an external communication link or interface; for example, an Ethernet connection. The mobile electronic device 201 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 250 may comprise a vibrator for providing vibratory notifications in response to various events on the mobile electronic device 201 such as receipt of an electronic communication or incoming phone call, or for other purposes such as haptic feedback (e.g. touch feedback).

The mobile electronic device 201 also includes a second memory component, such as the storage memory 230. The storage memory 230 is a memory component or an area of memory from which the operating system 222 is not configured to run software modules 220 directly. Storage memory 230 (i.e. the second memory component) differs from application memory 241 (i.e. the first memory component) in that the operating system 222 is configured to execute applications 224 or computer readable instructions 229 directly from the application memory 241 while it cannot execute applications or computer readable instructions 229 directly from the storage memory 230.

As will be explained in greater detail below, resource files 280 may be stored on the storage memory 230 and used, as needed, by the computer readable instructions 229 on the application memory 241.

The storage memory 230 may, in various example embodiments, be comprised of a removable memory card (typically comprising flash memory), such as, for example, a Secure Digital (SD), mini Secure Digital (miniSD), micro Secure Digital (microSD), or CompactFlash™ card. In some example embodiments, the storage memory 230 may be comprised of an internal (non-removable) memory which is designated by the operating system as storage memory 230 and not application memory 241. For example, the storage memory 230 may be e-MMC™ memory. The storage memory 230 is inserted in or connected to a storage memory interface 232 of the mobile electronic device 201.

The storage memory 230 and/or the application memory 241 may also store other data 240. In various example embodiments, the other data 240 may include service data including information required by the mobile electronic device 201 to establish and maintain communication with the wireless network 200. The data 240 may also include user application data such as email messages, address book and contact information, calendar and schedule information, notepad documents, image files, and other commonly stored user information stored on the mobile electronic device 201 by its user, and other data.

The serial data port 252 may be used for synchronization with a user's host computer system (not shown). The serial data port 252 enables a user to set preferences through an external device or software application and extends the capabilities of the mobile electronic device 201 by providing for information or software downloads to the mobile electronic device 201 other than through the wireless network 200. The alternate download path may, for example, be used to load an encryption key onto the mobile electronic device 201 through a direct, reliable and trusted connection to thereby provide secure device communication.

Applications 224 may, in some example embodiments, be received through the data port 252. For example, in some embodiments, applications 224 may be received through the data port 252 from a host computer connected to the data port 252. Applications 224 received through the data port 252 may be installed on the device 201 by the installation manager module 228 in the manner described in this disclosure. That is, in at least some example embodiments, the installation manager module 228 receiving the application 224 may perform a split installation of the application 224 by installing at least one application file (such as the computer readable instructions 229) associated with the application 224 to a first memory component (such as the application memory 241) and by installing at least one application file (such as the resource files 280) associated with the application 224 to a second memory component (such as the storage memory 230). The first memory component and the second memory component are physically distinct memory components. That is, the first memory component and the second memory component are not the same memory components.

In some example embodiments, the mobile electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile electronic device 201 to the host computer system via a USB cable or Bluetooth® connection, traffic that was destined for the wireless network 200 is automatically routed to the mobile electronic device 201 using the USB cable or Bluetooth® connection. Similarly, any traffic destined for the wireless network 200 is automatically sent over the USB cable Bluetooth® connection to the host computer system for processing.

The mobile electronic device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile electronic device 201, and the battery interface 236 provides a mechanical and electrical connection for the battery 238. The battery interface 236 is coupled to a regulator (not shown) which provides power V+ to the circuitry of the mobile electronic device 201.

The short-range communication subsystem 272 is an additional optional component which provides for communication between the mobile electronic device 201 and different systems or devices, which need not necessarily be similar devices. For example, the subsystem 272 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and/or voice communication applications will, in some example embodiments, be installed on the mobile electronic device 201 during or after manufacture. Additional applications and/or upgrades to the operating system 222 or software applications 224 may also be loaded onto the mobile electronic device 201 through the wireless network 200, the auxiliary I/O subsystem 250, the data port 252, the short-range communication subsystem 272, or other suitable subsystem 274 other wireless communication interfaces. The downloaded applications 224 may be permanently installed, for example, written into the application memory 241 (i.e. the flash memory 244) and/or the storage memory 230.

The mobile electronic device 201 may, in some example embodiments, provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by an email message application and output to the display 210. A user of the mobile electronic device 201 may also compose data items, such as email messages, for example, using the touch-sensitive overlay 206 in conjunction with the display device 204 and possibly the control buttons 260 and/or the auxiliary I/O subsystems 250. These composed items may be transmitted through the communication subsystem 211 over the wireless network 200.

In the voice communication mode, the mobile electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile electronic device 201. Although voice or audio signal output is typically accomplished primarily through the speaker 256, the display 204 may also be used to provide an indication of the identity of a calling party, duration of a voice call, or other voice call related information.

Figure 2:
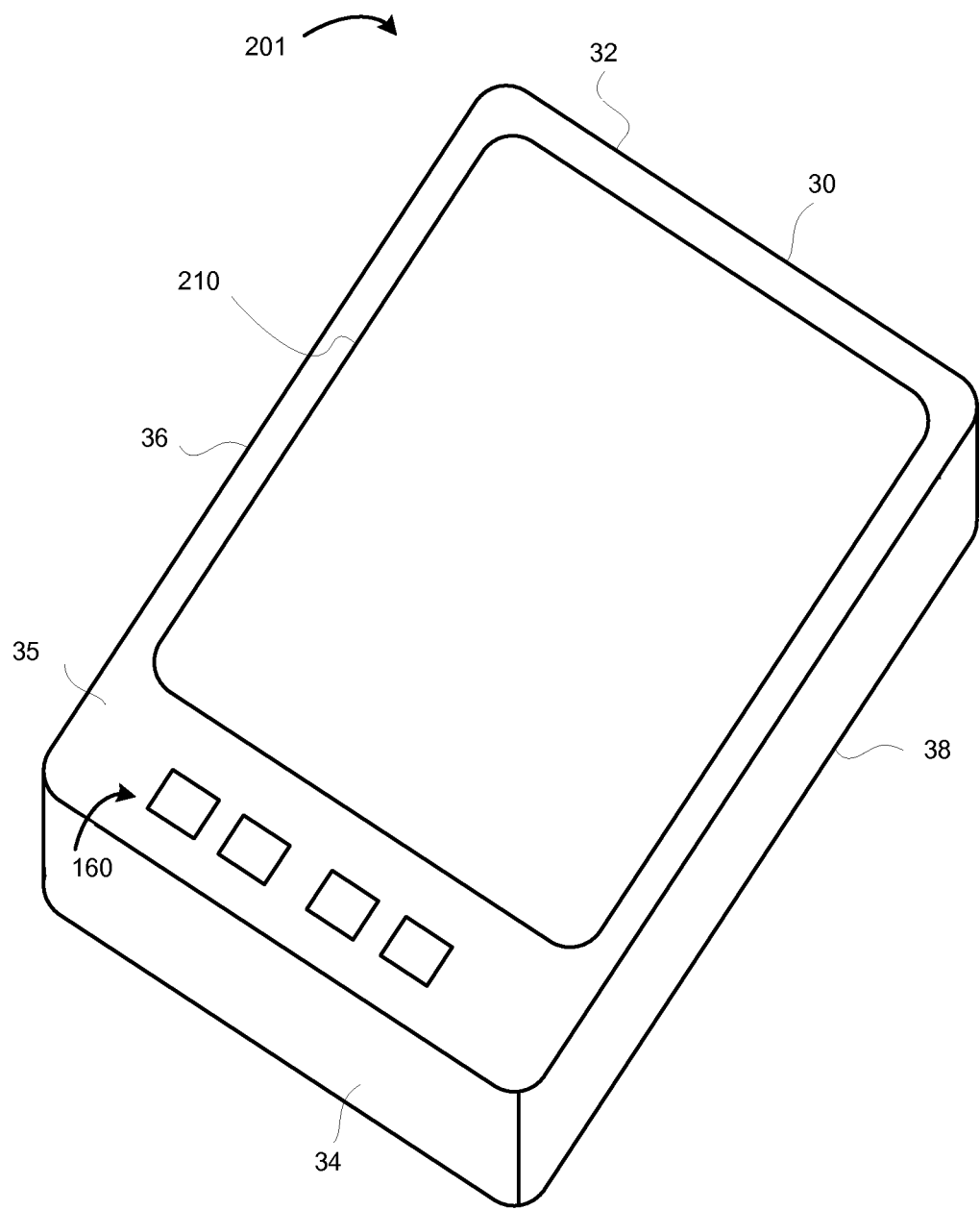
FIG. 2 is a perspective view of the mobile electronic device of FIG. 1 in accordance with example embodiments of the present disclosure.

Reference will now be made to FIG. 2 which illustrates an example mobile electronic device 201 in which example embodiments of the present disclosure may be applied. The mobile electronic device 201 includes a housing 30 for housing at least some of the components of the device 201 identified in FIG. 1. The housing 30 is configured to be held or cradleable in a user's hand while the mobile electronic device 201 is in use. The touchscreen display 210 is mounted within a front face 35 of the housing 30 so that the housing 30 frames the touchscreen display 210 and exposes a portion of it for user-interaction therewith. In the shown example embodiments of FIG. 2, the housing 304 (and device 201) is elongate having a length, defined between top and bottom ends 32, 34, longer than a width, defined between left and right sides 36, 38. Other device dimensions and form factors are also possible.

In some devices 201, the operating system 222 is configured to run local applications 224, which are the applications installed to and stored within the application memory 241. The operating system 222 is also configured to run applications having computer readable instructions 229 stored in application memory 241. The operating system 222 is not configured to run applications 224 which are fully stored in other places (apart from the application memory 241); such as, for example, the storage memory 230. The operating system 222 is not configured to run applications 224 which do not have computer readable instructions 229 or complete local applications 224 stored on the application memory 241. That is, the operating system 222 may require that, at least some components of applications, such as the computer readable instructions 229, be installed on application memory 241 for those applications to be run from the device 221. In order to maximize the use of the limited application memory 241, the installation manager module 228 may, for at least some applications, install only the computer readable instructions 229 to the application memory 241. Other resource files 280 associated with an application, such as image files, video files and/or audio files, may be stored on storage memory 230 and retrieved by the computer readable instructions 229 as required.

An overview having been provided, reference will now made to the flowcharts of FIGS. 3 to 6. The mobile electronic device 201 may be configured to perform one or more of the methods 300, 400, 500, 600 illustrated in these flowcharts. More specifically, one or more controller of the device 201 (FIG. 1), such as the processor 240 (FIG. 1), may be configured to execute the steps of any one or more of the methods 300, 400, 500, 600 of FIGS. 3 to 6. In some example embodiments, the installation manager module 228 may contain instructions for the processor 240 for executing one or more of the methods 300, 400, 500, 600 of FIGS. 3 to 6. In the following discussion of the methods of FIGS. 3 to 6 all reference numerals which relate to device components (as opposed to steps of a process or method), such as the processor 240 or the application memory 241, refer to device components of FIG. 1.

Figure 3:
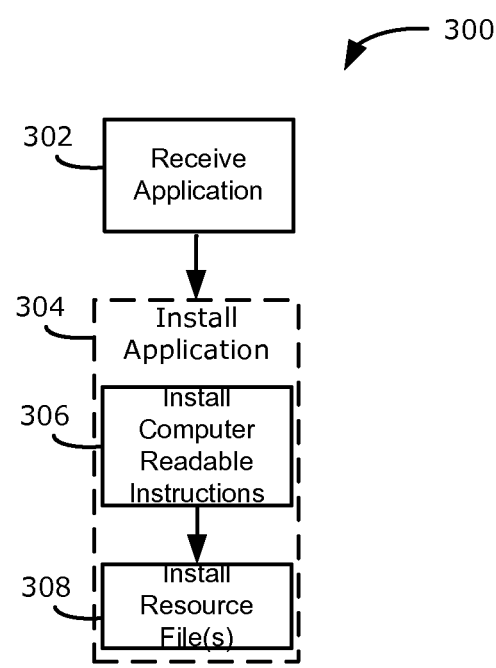
FIG. 3 is a flowchart illustrating a method for installing an application in accordance with example embodiments of the present disclosure.

Referring first to FIG. 3, a method 300 for installing an application to the mobile electronic device 201 in accordance with one example embodiment of the present disclosure is illustrated.

At step 302 an application 224 is received at the device 201. The application may be received, for example, through the application store client 226. More particularly, the application 224 may be transmitted by an application delivery server (not shown) to the device 201 and received at the application store client 226. The application may, in some example embodiments, be received wirelessly at the device 201 from the application delivery server. The received application includes one or more application files. The application files are comprised of computer readable instructions 229 and, in some example embodiments, one or more resource files 280. The resource files are non-executable files, such as image files, video files and/or audio files which are referenced by the computer readable instructions.

In some example embodiments, in response to receiving the application (at step 302), the installation manager module 228 may initiate installation of the application.

At step 304, after the application 224 is received at the device 201, the application may be installed to the device 201 by the installation manager module 228. The step 304 of installing the application 224 to the device 201 includes a step 306 of installing computer readable instructions 229 associated with the application 224 to the first memory component of the device, such as the application memory 241 of the device 201, and a step 308 of installing one or more resource files associated with the application to the second memory component associated with the device, such as the storage memory 230.

The step 306 of installing the computer readable instructions 229 to the application memory 241 includes storing computer readable instructions 229 associated with the application on the first memory component (which is, in the example shown, the application memory 241). The step 306 may also include one or more of the following steps: extracting files, such as the computer readable instructions, from a compressed installation file; registering files, such as the computer readable instructions, in an operating system 222 and/or a system registry; adding a link to the computer readable instructions 229 to a user interface screen associated with the device, such as a menu screen which may be in the form of an icon grid array. The step 306 of installing computer readable instructions 229 to the application memory 241 may also include other sub-steps which are not specifically discussed above.

The step 308 of installing one or more resource files associated with the application to a second memory component, such as the storage memory 230 includes storing one or more resource files on the second memory component, such as the storage memory 230. The step 308 may also include a step of extracting the one or more resource files from a compressed file. The step 308 of installing one or more resource files may also include other sub-steps which are not specifically discussed above.

While in the example embodiment described above. the receipt of an application acts as a trigger condition to initiate installation of the application on the device, in other example embodiments, other trigger conditions may be used to initiate installation of the application. For example, in one example embodiment, installation of the application on the device 201 may be initiated in response to a user-generated input received through an input mechanism 260. That is, a user of the device may interact with an input mechanism 260 to input a command to install the application to the device 201. For example, a user may select an "install application" icon or element displayed on the display 210 (or another suitably named icon or element), in order to initiate the installation of the application on the device 201.

Figure 4:
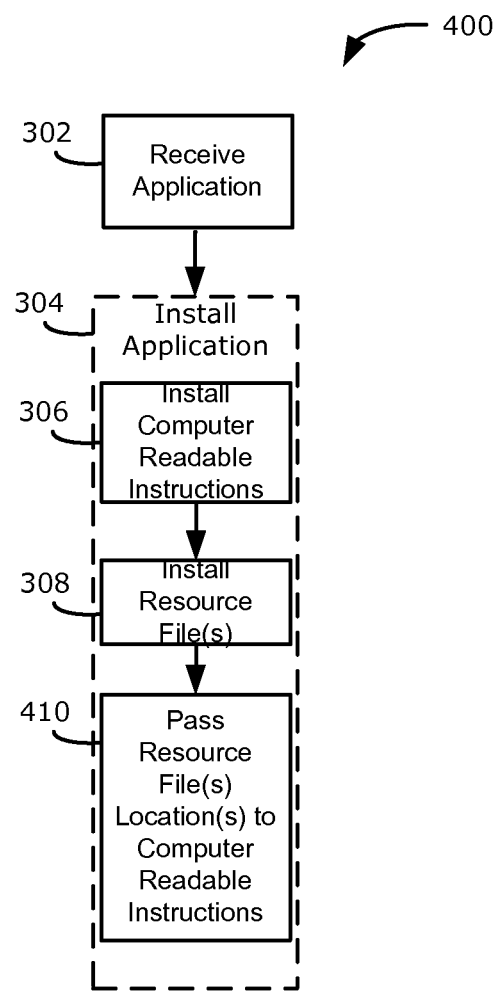
FIG. 4 is a flowchart illustrating a method for installing an application in accordance with example embodiments of the present disclosure.

Referring now to FIG. 4, a further method 400 for installing an application to the mobile electronic device 201 in accordance with an example embodiment of the present disclosure is illustrated. In the method 400 of FIG. 4, the installation manager module 228 is configured to provide location information to the computer readable instructions 229 to inform the computer readable instructions of the location at which the resource files have been stored.

The method 400 of FIG. 4 is similar to the method 300 of FIG. 3. The method 400 includes the step 302 of receiving the application 224 at the device 201. The step 302 of receiving the application at the device 201 is discussed in greater detail above with reference to FIG. 3.

In response to the receipt of the application at the device 201, or in response to another trigger condition (such as, for example, a user generated input), the installation manager module 228 may initiate installation of the application.

Next, at step 304, after the application is received at the device 201, the application may be installed to the device 201 by the installation manager module 228. The step 304 of installing the application to the device 201 includes a step 306 of installing computer readable instructions 229 associated with the application to a first memory component of the device, such as the application memory 241 of the device 201, and a step 308 of installing one or more resource files associated with the application to a second memory component associated with the device, such as the storage memory 230. The step 304 of installing the application to the device 201 also includes a step 410 of passing a location of one or more resource files 280 to the computer readable instructions 229 on the first memory component (i.e. the application memory 241).

The step 306 of installing the computer readable instructions 229 is discussed in greater detail above with reference to FIG. 3. The step 308 of installing one or more resource files is also discussed in greater detail above with reference to FIG. 3.

At the step 308 of installing the one or more resource files, one or more resource files are stored on a second memory component, which is, in at least some example embodiments, the storage memory 230. The one or more resource files are stored at a location on the second memory component which is determined by the installation manager module 228. The location may be a folder, directory, catalogue, drawer, virtual container, or other memory location reference. The location may be determined according to one or more predetermined rules associated with the installation manager module 228 and/or the specific application.

In some embodiments (an example of which will be discussed below with reference to FIG. 5), there may be more than one second memory component associated with the device 201. For example, the device 201 may have a non-removable second memory component and also a removable second memory component. In such embodiments, the installation manager module 228 may be configured to select one of the second memory components and to store the resource files on the selected second memory components.

Accordingly, as noted above, the installation manager 228 may, at step 308, determine the location at which to store the resource files. As also noted above, the installation manager 228 may, in some example embodiments, select which second memory component to use and may, in some example embodiments, determine the location on the selected second memory component to store the files. In such embodiments, at step 410, the installation manager 228 may provide location information to the computer readable instructions 229 to inform the computer readable instructions 229 of the location at which the resource files are stored. The location information may include an identifier of the second memory component on which the resource files are stored. The location information may also include an identifier of a specific location on that second memory component where the resource files have been stored. For example, the location information may specify a folder, directory, catalogue, drawer, virtual container, or other memory location reference.

The location information may be provided to the computer readable instructions 229 in the form of a parameter. That is, the location information may be passed as a parameter to the computer readable instructions 229. The location information may be stored on the first memory component (which is in some example embodiments, the application memory 241) by the installation manager module 228 or, in some example embodiments, by the computer readable instructions 229.

While FIG. 4 illustrates an example embodiment in which the installation manager module 228 is configured to pass the location information to the computer readable instructions 229, in another example embodiment, the computer readable instructions 229 may be configured to independently determine the location of the one or more resource files. In such embodiments, the computer readable instructions 229 may include an algorithm for determining the location of the resource files. The algorithm which is included in the computer readable instructions 229 may be the same algorithm which is used by the installation manager module 228 at step 308 for determining a location to store the resource files. Since the computer readable instructions 229 include the same algorithm for determining the location of the resource files as the installation manager module 228, the computer readable instructions may execute the algorithm to determine where the resource files are located.

Figure 5:
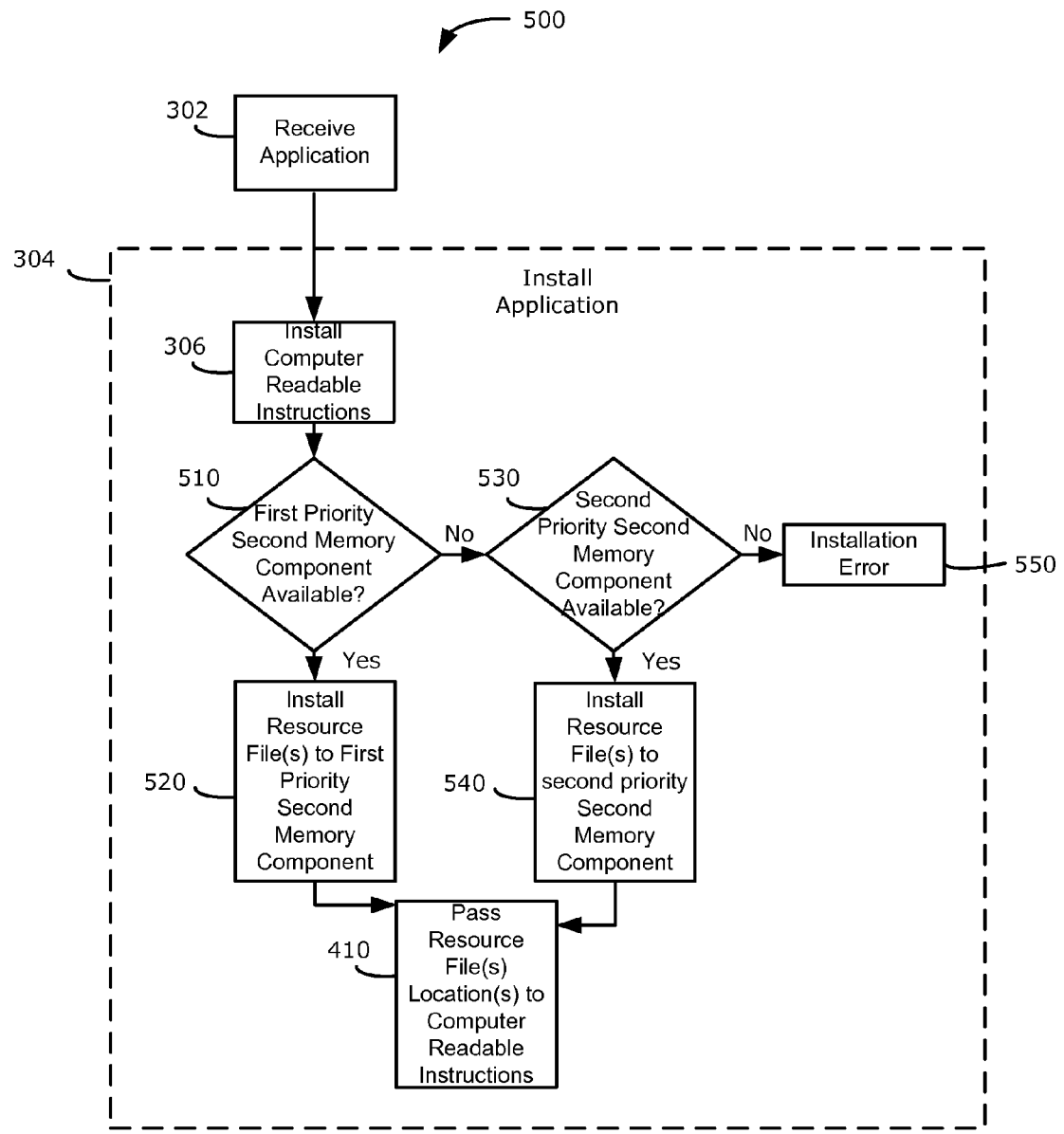
FIG. 5 is a flowchart illustrating a method for installing an application in accordance with example embodiments of the present disclosure.

Referring now to FIG. 5, a further method 500 for installing an application to the mobile electronic device 201 in accordance with one example embodiment of the present disclosure is illustrated. The method 500 of FIG. 5, may be implemented in example embodiments where the device 201 may be associated with two or more second memory components. For example, in some embodiments, the device 201 may have two second memory components, such as a non-removable second memory component (which may also be referred to as an internal memory component) and a removable second memory component (which may also be referred to as an external memory component). The installation manager module 228 may prioritize the memory components and store the one or more resource files on the highest priority second memory component which is available.

In some example embodiments, the priorities associated with the second memory components, or a method for determining the priorities, may be pre-programmed into the installation manager module 228. For example, the installation manager module 228, in some embodiments, is pre-configured to assign a removable second memory component a lower priority than a non-removable second memory component. In other example embodiments, the priorities may be set by a user of the device 201 or by a system administrator associated with the device 201.

The method 500 of FIG. 5 is similar to the method 300 of FIG. 3. The method includes the step 302 of receiving the application at the device 201. The step 302 of receiving the application at the device 201 is discussed in greater detail above with reference to FIG. 3.

In response to the receipt of the application at the device 201, or in response to another trigger condition (such as, for example, a user-generated input), the installation manager module 228 may initiate installation of the application.

Next, at step 304, after the application is received at the device 201, the application may be installed to the device 201 by the installation manager module 228. The step 304 of installing the application to the device 201 includes a step 306 of installing computer readable instructions associated with the application to a first memory component of the device, such as the application memory 241 of the device 201. The step 306 of installing the computer readable instructions 229 is discussed in greater detail above with reference to FIG. 3.

Next, at steps 510, the installation manager module 228 may be configured to determine whether a first priority second memory component is available. That is, the installation manager module 228 may determine whether a second memory component which is assigned the highest priority is available. The determination of availability may, in some example embodiments, be made based on the size of the one or more resource files associated with the application and the free space which is available on the second memory component. In some example embodiments, the installation manager module 228 may determine that the first priority second memory component is not available if the installation manager module 228 determines that the mathematical difference between the free space on the first priority second memory component and the size of the one or more resource file(s) is less than a predetermined threshold.

In some example embodiments, the predetermined threshold is zero. That is, the installation manager module 228 determines that the first priority second memory component is available if there is sufficient free space on the first priority second memory component to store the one or more resource files. If there is not sufficient free space to store the one or more resource files, the installation manager module 228 determines that the first priority second memory component is not available.

In other example embodiments, the predetermined threshold used in the determination step 510 may be greater than zero. That is, the installation manager module 228 determines that the first priority second memory component is not available if storing the one or more resource files on the first priority second memory component would result in the free space on the memory falling below a predetermined threshold, which is greater than zero. If storing the one or more resource files on the first priority second memory component would not result in the free space on the memory falling below the predetermined threshold, then the installation manager module 228 determines that the first priority second memory component is available. Otherwise, the installation manager module 228 may determine that the first priority second memory component is not available.

Next, at step 520, if it is determined that the first priority second memory component is available, the one or more resource files are installed to the first priority second memory component. The step 520 is similar to the step 308 of FIG. 3 and is discussed in greater detail above with reference to FIG. 3.

If, however, the first priority second memory component is not available (as determined at step 510), the installation manager module 228 may, at step 530, determine whether a second priority second memory component is available. That is, the installation manager module 228 may determine whether a second memory component which is assigned the second priority is available. The step 530 of determining whether the second priority second memory component is available is similar to the step 510 of determining whether a first priority second memory component is available, except in that the step 530 is performed on the second priority second memory component, while the step 510 is performed on the first priority second memory component.

The determination of availability may be made based on the size of the one or more resource files associated with the application and the free space which is available on the second priority second memory component. In some example embodiments, the installation manager module 228 may determine that the second priority second memory component is not available if the installation manager module 228 determines that the mathematical difference between the free space on the second priority second memory component and the size of the one or more resource file(s) is less than a predetermined threshold.

In some example embodiments, the predetermined threshold in step 530 is zero. That is, the installation manager module 228 determines that the second priority second memory component is available if there is sufficient free space on the second priority second memory component to store the one or more resource files. If there is not sufficient free space to store the one or more resource files, the installation manager module 228 determines that the second priority second memory component is not available.

In other example embodiments, the predetermined threshold used in the determination step 530 may be greater than zero. That is, the installation manager module 228 determines that the second priority second memory component is not available if storing the one or more resource files on the second priority second memory component would result in the free space on the memory falling below a predetermined threshold, which is greater than zero. If storing the one or more resource files on the second priority second memory component would not result in the free space on the memory falling below the predetermined threshold, then the installation manager module 228 determines that the second priority second memory component is available. Otherwise, the installation manager module 228 may determine that the second priority second memory component is not available.

The predetermined thresholds used in the step 510 of determining whether the first priority second memory component is available and the step 530 of determining whether the second priority second memory component is available are, in some example embodiments, the same for each of these steps 510, 530. However, in other example embodiments, the thresholds may be different. In some example embodiments, the threshold used in the step 530 of determining whether the second priority second memory component is available is less than the threshold used in the step 510 of determining whether the first priority second memory component is available.

Next, at step 540, if it is determined that the second priority second memory component is available, the one or more resource files are installed to the second priority second memory component. The step 540 is similar to the step 308 of FIG. 3 and is discussed in greater detail above with reference to FIG. 3.

If, at step 530, it is determined that the second priority second memory component is not available, in some example embodiments, an installation error may be produced by the installation manager module 228 on the display 210 associated with the device 201 at step 550.

In other example embodiments (not shown), there may be more than two second memory components associated with the device. In such embodiments, the installation manager module 228 may continue to determine whether a second memory component of a next-lower priority (i.e. a third priority, followed by a fourth priority, etc.) is available. If such a second memory component is available, the installation manager module 228 may store the resource files on that second memory component.

Following the installation of the resource files to one of the second memory components (at steps 520 or 540), at step 410, the installation manager module 228 may provide location information to the computer readable instructions 229 to inform the computer readable instructions 229 of the location at which the resource files 280 are stored. The location information may include an identifier of the second memory component on which the resource files are stored. The location information may also include an identifier of a specific location on that second memory component where the resource files have been stored. For example, the location information may specify a folder, directory, catalogue, drawer, virtual container, or other memory location reference. Step 410 is discussed in greater detail above with reference to FIG. 4.

Figure 6:
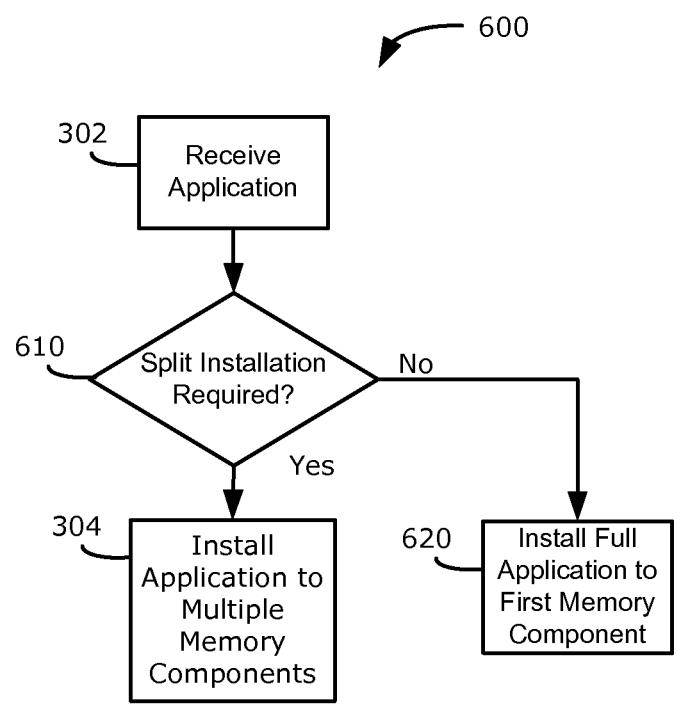
FIG. 6 is a flowchart illustrating a method for installing an application in accordance with example embodiments of the present disclosure.

Referring now to FIG. 6, a further method 600 for installing an application to the mobile electronic device 201 in accordance with one example embodiment of the present disclosure is illustrated.

In the method 600 of FIG. 6, the installation manager module 228 is configured to determine whether the installation of an application should be split onto two different memory components or whether the application should be installed entirely to a single memory component.

The method 600 of FIG. 6 is similar to the method 300 of FIG. 3. The method includes the step 302 of receiving the application at the device 201. The step 302 of receiving the application at the device 201 is discussed in greater detail above with reference to FIG. 3.

In response to the receipt of the application at the device 201, or in response to another trigger condition (such as, for example, user-generated input received via the input mechanism 260), the installation manager module 228 may initiate installation of the application.

Next, at step 610, the installation manager module 228 determines whether the installation of the application should be split onto more than one memory component or whether the application should be installed to a single memory component.

In some example embodiments, at step 610, the installation manager module 228 may determine whether the size of the one or more resource files associated with the application is greater than a predetermined threshold. If the size is greater than the predetermined threshold, the installation manager module 228 may determine that a split installation is required. If the size is less than the threshold, the installation manager module 228 may determine that split installation is not required. Such example embodiments permit the installation manager module 228 to determine whether a split installation should be performed based on the size of the one or more resource files. Where the resource files are too large, the installation manager module 228 may split the installation.

In some example embodiments, at step 610, the installation manager module 228 may determine whether a first memory component, which is, in some example embodiments, the application memory 241, has sufficient free space for the application to be installed in full on the first memory component. In some example embodiments, the installation manager module 228 may determine that the first memory component does not have sufficient free space if the installation manager module 228 determines that the mathematical difference between the free space on the first memory component and the size of the one or more resource file(s) or the application files is less than a predetermined threshold.

In some example embodiments, the predetermined threshold is zero. That is, the installation manager module 228 determines that the first memory component has sufficient free space available if the free space on the first memory component is able to store the one or more resource files and/or the application files. If there is not sufficient free space to store the one or more resource files and/or the application files, the installation manager module 228 determines that the first memory component is not available.

In other example embodiments, the predetermined threshold used in the determination step 610 may be greater than zero. That is, the installation manager module 228 determines that the first memory component is not available if storing the one or more resource files and/or the application files on the first memory component would result in the free space on the first memory component falling below a predetermined threshold. If storing the one or more resource files and/or the application files on the first memory component would not result in the free space on the first memory component falling below the predetermined threshold, then the installation manager module 228 determines that the first memory component does not have sufficient free space.

If the installation manager determines that the first memory component (i.e. the application memory 241) does not have sufficient free space, then it may determine that the installation of the application should be split onto more than one memory component.

In some example embodiments, at step 610, the determination regarding whether the installation of the application should be split onto multiple memory components is made based on user-generated input received via an input mechanism 260 associated with the device 201. That is, a user may force the installation manager module 228 to either split the installation onto multiple memory components or to install the application onto a single memory component.

In some example embodiments, at step 610, the installation manager module 228 determines whether the installation should be split onto two memory components by consulting an installation type identifier which is associated with the application. The installation type identifier indicates whether the installation of the application should be split. The installation type identifier may be received with the application at step 302. The installation type identifier acts as an instruction to the installation manager module 228 to instruct the installation manager module 228 regarding whether the installation should be split. The installation type identifier permits a developer of an application to provide instructions to the installation manager module 228 to instruct the installation manager module 228 regarding whether the installation of the application should be split.

If the installation type identifier indicates that the installation of the application should be split, the installation manager module 228 may determine, at step 610, that the installation should be split. If, however, the installation type identifier indicates that the installation of the application should not be split, then the installation manager module 228 may determine, at step 610, that the installation should not be split.

In some example embodiments, at step 610, the installation manager module 228 determines whether the installation should be split onto two memory components based on the format of the application received at step 302. In some example embodiments, if the application is received in a format in which the computer readable instructions are separated from the resource files, then the installation manager module 228 may determine that the installation should be split onto multiple memory components.

If the installation manager module 228 determines that the installation should be split, then the method 600 proceeds to step 304 where the application is installed to multiple memory components. The step 304 may be the step 304 from any one of FIG. 3, 4 or 5.

If, however, the installation manager module 228 determines that the installation should not be split, then the installation manager module 228, at step 620, installs the application in full to the first memory component, which is, in at least some example embodiments, the application memory 241.

The step 620 of installing the application includes storing computer readable instructions 229 associated with the application on the first memory component (i.e. the application memory 241). The step 620 may also include any combination of the following steps: extracting files, such as the computer readable instructions and/or resource files, from a compressed installation file; registering files, such as the computer readable instructions in an operating system 222 and/or a system registry; adding a link to the computer readable instructions to a user interface screen associated with the device, such as a menu screen which may be in the form of an icon grid array; and storing the resource files on the first memory component (i.e. the application memory 241). The step 620 of installing computer readable instructions 229 to the application memory 241 may also include other sub-steps which are not specifically discussed above.

It will be appreciated that the methods 300, 400, 500, 600 may be varied and that steps may be added or removed from these methods 300, 400, 500, 600. It will be further appreciated that, in some example embodiments, steps from two or more of these methods 300, 400, 500, 600 may be combined in order to provide an embodiment which includes functions or features of two or more of these methods 300, 400, 500, 600.

It will also be appreciated that, while FIG. 1. illustrates an example embodiment where the installation manager module 228 is separate from the application, in some example embodiments, the installation manager module 228 may be provided, in whole or in part, in an application. That is, each application may be delivered together with its own installation manager module which is configured to perform the methods 300, 400, 500, 600 described herein.

In accordance with further example embodiments of the present disclosure, there are provided a computer program product comprising a computer readable medium having stored thereon computer executable instructions comprising instructions for practising the methods of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

While the present disclosure is primarily described as a method, a person of ordinary skill in the art will understand that the present disclosure is also directed to various apparatus such as a mobile electronic device for carrying out at least some of the aspects and features of the described methods and including components for performing at least some of the described method steps, be it by way of hardware components, a computer programmed by appropriate software to enable the practice of the disclosed method, by any combination of the two, or in any other manner. Moreover, an article of manufacture for use with the apparatus, such as a prerecorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The embodiments of the present disclosure described above are intended to be examples only. Those of skill in the art may affect alterations, modifications and variations to the particular example embodiments without departing from the intended scope of the present disclosure. In particular, features from one or more of the above-described embodiments may be selected to create alternate embodiments comprised of a sub-combination of features which may not be explicitly described above. In addition, features from one or more of the above-described example embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method of installing an application to an electronic device comprising:
  receiving, at the electronic device, application files defining the application, wherein the application files include computer readable instruction files and resource files, and wherein the resource files are configured to be accessed by the computer readable instruction files; and
  in response to receiving the application files:
    separating the computer readable instruction files from the resource files;
    determining whether a split installation is required;
    if a split installation is required, then installing the application to multiple memory components associated with the electronic device by:
      installing the computer readable instruction files to a first memory component associated with the electronic device; and
      installing the resource files to a second memory component associated with the electronic device; and
    if a split installation is not required, then installing the application to the first memory component associated with the electronic device, wherein the first memory component associated with the electronic device and the second memory component associated with the electronic device are physically separate memory components associated with the electronic device.

2. The method of claim 1, wherein the second memory component associated with the electronic device is a removable memory component.

3. The method of claim 1, wherein the electronic device includes an operating system stored on the first memory component associated with the electronic device, which is configured to execute computer readable instructions stored on the first memory component associated with the electronic device and further configured to not execute computer readable instructions stored on the second memory component associated with the electronic device.

4. The method of claim 1, wherein the computer readable instruction files comprise executable code.

5. The method of claim 1, wherein the resource files include one or more of: graphic files; video files; or audio files.

6. The method of claim 1, wherein installing the resource files to the second memory component associated with the electronic device comprises:
  determining whether a first priority second memory component associated with the electronic device contains sufficient free space to store the resource files;
  if the first priority second memory component associated with the electronic device contains sufficient free space to store the resource files, then installing the resource files to the first priority second memory component associated with the electronic device; and
  if the first priority second memory component associated with the electronic device does not contain sufficient free space to store the resource files, then installing the resource files to a second priority second memory component associated with the electronic device.

7. The method of claim 1, further comprising:
after installing the resource files to the second memory component associated with the electronic device, passing a location of the resource files to the computer readable instruction files.

8. The method of claim 1, wherein determining whether a split installation is required includes:
determining whether the application is in a format which allows a split installation;
if the application is in a format which allows a split installation, then determining that a split installation is required; and
if the application is not in a format which allows a split installation, then determining that a split installation is not required.

9. An electronic device comprising:
a first memory component;
a second memory component; and
at least one processor configured to:
receive application files defining an application, wherein the application files include computer readable instruction files and resource files, and wherein the resource files are configured to be accessed by the computer readable instruction files; and
in response to receiving the application files:
separate the computer readable instruction files from the resource files;
determine whether a split installation is required;
if a split installation is required, then install the application to multiple memory components associated with the electronic device by:
installing the computer readable instruction files to the first memory component associated with the electronic device; and
installing the resource files to the second memory component associated with the electronic device; and
if a split installation is not required, then install the application to the first memory component associated with the electronic device, wherein the first memory component associated with the electronic device and the second memory component associated with the electronic device are physically separate memory components associated with the electronic device.

10. The electronic device of claim 9, wherein the second memory component associated with the electronic device is a removable memory component.

11. The electronic device of claim 9, wherein the electronic device includes an operating system stored on the first memory component associated with the electronic device, which is configured to execute computer readable instructions stored on the first memory component associated with the electronic device and further configured to not execute computer readable instructions stored on the second memory component associated with the electronic device.

12. The electronic device of claim 9, wherein the computer readable instruction files comprise executable code.

13. The electronic device of claim 9, wherein the resource files include one or more of: graphic files; video files; or audio files.

14. The electronic device of claim 9, wherein installing the resource files to the second memory component associated with the electronic device comprises:

determining whether a first priority second memory component associated with the electronic device contains sufficient free space to store the resource files;
if the first priority second memory component associated with the electronic device contains sufficient free space to store the resource files, then installing the resource files to the first priority second memory component associated with the electronic device; and
if the first priority second memory component associated with the electronic device does not contain sufficient free space to store the resource files, then installing the resource files to a second priority second memory component associated with the electronic device.

15. The electronic device of claim 9, wherein the at least one processor is further configured to, after installing the resource files on the second memory component associated with the electronic device, pass a location of the resource files to the computer readable instruction files.

16. The electronic device of claim 9, wherein determining whether a split installation is required includes:
determining whether the application is in a format which allows a split installation;
if the application is in a format which allows a split installation, then determining that a split installation is required; and
if the application is not in a format which allows a split installation, then determining that a split installation is not required.

17. A computer program product comprising a non-transitory computer readable storage medium having encoded thereon computer executable instructions, the computer executable instructions comprising instructions to:
receive, at an electronic device, application files defining an application, wherein the application files include computer readable instruction files and resource files, and wherein the resource files are configured to be accessed by the computer readable instruction files; and
in response to receiving the application files:
separate the computer readable instruction files from the resource files;
determine whether a split installation is required;
if a split installation is required, then install the application to multiple memory components associated with the electronic device by:
installing the computer readable instruction files to a first memory component associated with the electronic device; and
installing the resource files to a second memory component associated with the electronic device; and
if a split installation is not required, then install the application to the first memory component associated with the electronic device, wherein the first memory component associated with the electronic device and the second memory component associated with the electronic device are physically separate memory components associated with the electronic device.

18. The computer program product of claim 17, wherein the second memory component associated with the electronic device is a removable memory component.

19. The computer program product of claim 17, wherein the electronic device includes an operating system stored on the first memory component associated with the electronic device, which is configured to execute computer readable instructions stored on the first memory component associated with the electronic device and further configured to not execute computer readable instruction stored on the second memory component associated with the electronic device.

20. The computer program product of claim 17, wherein the computer readable instruction files comprise executable code.

21. The computer program product of claim 17, wherein the resource files include one or more of: graphic files; video files; or audio files.

22. The computer program product of claim 17, wherein installing the resource files to the second memory component associated with the electronic device comprises:
   determining whether a first priority second memory component associated with the electronic device contains sufficient free space to store the resource files;
   if the first priority second memory component associated with the electronic device contains sufficient free space to store the resource files, then installing the resource files to the first priority second memory component associated with the electronic device; and
   if the first priority second memory component associated with the electronic device does not contain sufficient free space to store the resource files, then installing the resource files to a second priority second memory component associated with the electronic device.

23. The computer program product of claim 17, further comprising computer executable instructions to, after installing the resource files to the second memory component associated with the electronic device, pass a location of the resource files to the computer readable instruction files.

24. The computer program product of claim 17, wherein determining whether a split installation is required includes:
   determining whether the application is in a format which allows a split installation;
   if the application is in a format which allows a split installation, then determining that a split installation is required; and
   if the application is not in a format which allows a split installation, then determining that a split installation is not required.

* * * * *